United States Patent
Vernay et al.

(10) Patent No.: US 11,284,558 B2
(45) Date of Patent: Mar. 29, 2022

(54) BIOPOLYMER-BASED SEED COATINGS COMPOSITIONS AND METHODS FOR USE

(71) Applicant: RHODIA OPERATIONS, Paris (FR)

(72) Inventors: Clara Vernay, Paris (FR); Jean-Christophe Castaing, Sevres (FR); Zhiyun Chen, Newtown, PA (US); Thierry Vidal, Lyons (FR)

(73) Assignee: RHODIA OPERATIONS, Paris (FR)

( * ) Notice: Subject to any disclaimer, the term of this patent is extended or adjusted under 35 U.S.C. 154(b) by 676 days.

(21) Appl. No.: 16/192,952

(22) Filed: Nov. 16, 2018

(65) Prior Publication Data

US 2019/0150354 A1     May 23, 2019

Related U.S. Application Data

(60) Provisional application No. 62/587,686, filed on Nov. 17, 2017.

(51) Int. Cl.

| | |
|---|---|
| *A01C 1/06* | (2006.01) |
| *C09D 105/00* | (2006.01) |
| *C09D 103/12* | (2006.01) |
| *C09D 105/02* | (2006.01) |
| *C09D 103/02* | (2006.01) |

(52) U.S. Cl.
CPC .............. *A01C 1/06* (2013.01); *C09D 103/02* (2013.01); *C09D 103/12* (2013.01); *C09D 105/00* (2013.01); *C09D 105/02* (2013.01)

(58) Field of Classification Search
CPC ....................................................... A01C 1/06
See application file for complete search history.

(56) References Cited

U.S. PATENT DOCUMENTS

| | | |
|---|---|---|
| 4,513,019 A | 4/1985 | Brancq et al. |
| 4,543,370 A | 9/1985 | Porter et al. |
| 4,576,646 A | 3/1986 | Branco et al. |
| 2003/0027739 A1* | 2/2003 | Dale .................. C11D 3/38672 510/446 |
| 2004/0151750 A1 | 8/2004 | O'Leary et al. |
| 2005/0108936 A1* | 5/2005 | Hartle ...................... A01C 1/06 47/57.6 |
| 2012/0208699 A1* | 8/2012 | Pearce ................... A01N 63/20 504/117 |
| 2012/0220454 A1* | 8/2012 | Chen ...................... A01N 25/00 504/100 |
| 2013/0165487 A1* | 6/2013 | Arthur ................... A01N 43/78 514/365 |
| 2015/0157015 A1 | 6/2015 | Ji et al. |
| 2016/0249523 A1* | 9/2016 | Nogueira ............... A01N 47/40 111/100 |
| 2017/0127603 A1* | 5/2017 | Reus ......................... A01C 1/06 |
| 2017/0245494 A1* | 8/2017 | Bardosh .................... C08J 5/18 |
| 2018/0251654 A1* | 9/2018 | Chen .................... C09D 103/02 |
| 2019/0029266 A1* | 1/2019 | Sawant .................... C05G 3/50 |
| 2019/0307056 A1* | 10/2019 | Reece ...................... C08K 3/34 |

FOREIGN PATENT DOCUMENTS

| | | | |
|---|---|---|---|
| WO | 99/57959 A1 | 11/1999 | |
| WO | 2015/003624 A1 | 1/2015 | |
| WO | WO-2018118740 A1 * | 6/2018 | ............. A01N 43/80 |

* cited by examiner

*Primary Examiner* — Monica L Barlow
(74) *Attorney, Agent, or Firm* — Osha Bergman Watanabe & Burton LLP

(57) ABSTRACT

A seed or seedling is coated with a cross-linked biopolymer and, optionally, a second binder selected from underivatized guar, cationic hydroxypropyl guar, polyacrylamide, poly (methacrylic acid), poly(acrylic acid), polyacrylate, poly (ethylene glycol), polyethyleneoxide, polyamide, hydroxypropyl guar, carboxymethyl guar, carboxymethylhydroxypropyl guar, underivatized starch, cationic starch, corn starch, wheat starch, rice starch, potato starch, tapioca, waxy maize, *sorghum*, waxy sarghum, sago, dextrin, chitin, chitosan, xanthan gum, carageenan gum, gum karaya, gum arabic, pectin, cellulose, hydroxycellulose, hydroxyalkyl cellulose, hydroxyethyl cellulose, carboxymethylhydroxyethyl cellulose, or hydroxypropyl cellulose. The seed coating composition is characterized by a dust value, as measured using a Heubach dustmeter device, which is lower by at least 30% as compared to an analogous composition that does not contain the crosslinked biopolymer.

26 Claims, No Drawings

BIOPOLYMER-BASED SEED COATINGS COMPOSITIONS AND METHODS FOR USE

CROSS-REFERENCE TO RELATED APPLICATIONS

This application claims the benefit of U.S. Provisional Application Ser. No. 62/587,686, filed Nov. 17, 2017, hereby incorporated by reference in its entirety.

FIELD OF INVENTION

This invention relates to methods and compositions relating to agricultural coatings and, in particular, to seeds coated with guar or guar derivatives, and methods for use, as well as improved dust suppression effects from using such compositions.

BACKGROUND OF THE INVENTION

Seeds are sometimes commercially treated to promote good seedling establishment. Protection of seeds and young seedlings from pests in and around the soil during the early stages of plant growth is one concern. Another concern is the protection of seeds and seedlings from drought or damage from lack of available water.

U.S. Pat. No. 4,543,370 appears to describe seed coatings containing a cellulosic film-forming polymer, a pigment, a plasticizer, silica and a surfactant. U.S. Pat. Nos. 4,513,019 and 4,576,646 describe a process for coating seeds with a cellulosic film-forming composition, at least one alpha-cellulose, and a suitable plasticizer.

SUMMARY OF INVENTION

Described herein are dry or semi-dry seed coating compositions that promote seedling establishment through water retention or water absorption. Also described herein are dry seed coating compositions that promote seedling establishment as one or more layers of the seed coating composition act as a wetting agent, which wets the adjacent/surrounding area of soil around the seed. Further, described herein are dry coating compositions that promote the retention of active ingredients or agricultural compounds in the soil, such that the agricultural compounds are available or more readily available to plants, vegetation, grasses, trees, and the like. Further, described herein are coating compositions that promote the ability to maintain or sustain active ingredients or agricultural compounds in the soil, such that the active ingredients are available or more readily available to plants, vegetation, grasses, trees, and the like.

Currently, one drawback when applying active ingredients or agricultural compounds, such as pesticides, herbicides, and the like, to soil is that these agricultural compounds active ingredients or are lost with water runoff or drainage, and thus not available for grass and plants and the like. The phrases "dry seed coating compositions" and "dry coating composition" are defined herein as excluding hydrogels but not excluding seeds which comprise normal moisture which is necessary to maintain viability.

In one aspect, described herein are coated seed compositions comprising:
at least one seed; and
at least one layer coating all or part of the seed, the layer comprising:
a crosslinked biopolymer; and
optionally, a second binder comprising guar, derivatized guar, starch, derivatized starch, or a combination of any of the foregoing.

In one embodiment, a crosslinked biopolymer has an average particle size of less than about 400 nm, or in another embodiment has an average particle size of less than about 600 nm, or in another embodiment has an average particle size of less than about 800 nm. In a further embodiment, the crosslinked biopolymer has an average particle size of less than 1000 nm, or 900 nm, or 800 nm, or 700 nm, or 600 nm, or 500 nm, or 300 nm, or 200 nm. In another embodiment, the crosslinked biopolymer has an average particle size of less than 200 nm, or 175 nm, or 150 nm, or 125 nm, or 100 nm, or 75 nm, or 50 nm, or 25 nm. In one embodiment, the crosslinked biopolymer is a concentrated and stable dispersion of a crosslinked biopolymer.

In one embodiment, the layer comprises at least both the crosslinked biopolymer and the second binder. In one embodiment, the crosslinked biopolymer is amylose or amylopectin.

In a further embodiment, the composition of the present invention is characterized by a dust value, as measured using a Heubach dustmeter device, which is lower by at least 30% as compared to an analogous composition that does not contain the crosslinked biopolymer. The Heubach dustmeter can be set with values such as rotation speed (from 1 rpm to 100 rpm), rotation time (1 sec to 500 seconds), airflow rate (from 1 L/min to 500 L/min). In one embodiment, the Heubach dustmeter is set with the following parameters: rotation speed 30 rpm, rotation time 120 seconds and airflow rate 20 L/min.

In another embodiment, the composition is characterized by a dust value, as measured using a Heubach dustmeter device, which is lower by at least 40%, or which is lower by at least 50%, or which is lower by at least 60%, or which is lower by at least 70%, or which is lower by at least 80%, or which is lower by at least 90%, as compared to an analogous composition that does not contain the crosslinked biopolymer or, in other embodiments, the at least one layer.

In one embodiment, the Heubach dustmeter is set with the following parameters: rotation speed: 10-50 rpm, rotation time: 40-200 seconds and airflow rate 5-40 L/min. In one embodiment, the Heubach dustmeter is set with the following parameters: rotation speed: 20-40 rpm, rotation time: 90-150 seconds and airflow rate 10-30 L/min.

In one embodiment, the seed is selected from the group consisting of rice, corn, wheat, barley, oats, soybean, sunflower, alfalfa, *sorghum*, rapeseed, sugar beet, tomato, bean, carrot, tobacco and flower seeds. In another embodiment, the composition further comprises at least one active ingredient. The active ingredient can be any one or more of: herbicides, plant growth regulators, crop dessicants, fungicides, bacteriocides, bacteriostats, insecticides, insect repellants, adjuvants, surfactants, fertilizers and any mixtures thereof.

In one embodiment, the derivatized guar comprises carboxymethyl guar, hydroxyethyl guar, hydroxypropyl guar, carboxymethylhydroxypropyl guar, cationic guar, cationic hydroxypropyl guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, hydrophobically modified cationic guar, or any combination thereof.

In one embodiment, the seed has a shelf-life at room temperature in ambient conditions in an unsealed container without added salts or adjuvants of at least two months. The composition can also further comprise at least one filler. The filler can comprise: wood flours, clays, activated carbon, carbohydrates, sugars, dextrins, maltodextrins, diatomaceous earth, cereal flours, wheat flour, oat flour, barley flour, calcium carbonate, calcium bentonite, kaolin, china clay, talc, perlite, mica, vermiculite, silicas, quartz powder, montmorillonite and/or mixtures thereof.

In an additional aspect, described herein are methods for preparing a coated seed composition having dust suppression benefits comprising the step of contacting at least a portion of at least one seed with at least one layer comprising:

a crosslinked biopolymer; and optionally, a second binder comprising guar, derivatized guar, starch, derivatized starch, or a combination of any of the foregoing, wherein the coated seed composition is characterized by a dust value, as measured using a Heubach dustmeter device, which is lower by at least 30% as compared to an analogous composition that does not contain the crosslinked biopolymer.

In one embodiment, the second binder comprises a hydroxypropyl guar, a cationic hydroxypropyl guar, or a combination thereof. In one embodiment, the second binder comprises trimethyamino (2-hydroxyl)propyl cationic guar. In other embodiments, the second binder is a cationic compound selected from the following: homopolymers and copolymers of cationic styrenic monomers, homopolymers and copolymers of cationic allylic monomers, homopolymers and copolymers of (meth)acrylamido cationic monomers, homopolymers and copolymers of (meth)acrylate cationic monomers, polyvinylamine, cationic polyacrylamide, cationic polyvinyl alcohol, Polyquaternium-2; polyureylene ammonium salt, cationic starch, cationic cellulose, cationic hydroxyl-ethyl cellulose, cationic xanthan gum, cationic carageenan gum, cationic karaya gum, cationic arabic gum, cationic Lara gum, cationic canafen gum, cationic *cassia* gum, cationic konjac gum, cationic daincha, cationic fenugreek gum, cationic locust bean gum, cationic psyllium seed gum, cationic konjak, cationic mesquite gum, cationic ivory nut mannan gum, cationic alginate, cationic *agar*, cationic ulvane, cationic tragacanth gum, cationic ghatti gum, cationic tamarind gum, cationic xyloglucan, cationic inulin, cationic proteins, cationic pectin and cationic hemicellulose.

The present invention relates to the development of novel bio-based binding material for seed treatment applications in agricultural industry. The binding material is made from renewable bio-sources. Thus, such material can be easily mixed into seed treatment formulations and used in seed treatment process. This binding material reduces the loss of seed treatment formulation ingredients from dust-off. The present invention provides a binding material from bio-source and shows good performance in dust-off reduction, seed safety, and processability (i.e., ease of processing).

Thus, the present invention and its use of bio-based binding material are important to seed treatment industry due to its effects of: (1) Preventing the loss of active ingredients (AIs) in the seed coating after treatment, (2) Reducing the potential negative sequence from unintended deposit of hazardous active ingredients, and (3) Facilitating the seed treatment process

DETAILED DESCRIPTION OF INVENTION

The present invention concerns seed coating compositions that are easy to process, transport and handle, and in particular possesses dust-suppression benefits. The invention also concerns a method to increase the growth of a plant comprising administering a composition comprising at least one or more of the compounds as described herein on a seed of said plant.

A seed is coated for various reasons such as to aid is sustaining the seed is adverse conditions, to aid in propagating the seed, to provide a protective layer for the seed, when the seed is too small or non-uniform (from seed to seed) and the shape of sown seeds is desired to be uniform, and the like. In one embodiment, seed coating compositions described herein are prepared such that they are smoother, rounder, more uniform, and optionally, can also be larger and/or heavier than the original seed. Techniques utilized to "sow" the seed can vary from a belt, plate, cup, vacuum or the like. The seed coating composition can be placed individually, with improved spacing and depth control. The seed coating composition described herein can flow better through the seeding mechanism, because their surface is smoother than that of non-coated seed.

Throughout the description, including the claims, the term "comprising one" should be understood as being synonymous with the term "comprising at least one", unless otherwise specified, and "between" should be understood as being inclusive of the limits.

As used herein, "alkyl" groups include saturated hydrocarbons having one or more carbon atoms, including straight-chain alkyl groups, such as methyl, ethyl, propyl, butyl, pentyl, hexyl, heptyl, octyl, nonyl, decyl, cyclic alkyl groups (or "cycloalkyl" or "alicyclic" or "carbocyclic" groups), such as cyclopropyl, cyclopentyl, cyclohexyl, cycloheptyl, and cyclooctyl, branched-chain alkyl groups, such as isopropyl, tert-butyl, sec-butyl, and isobutyl, and alkyl-substituted alkyl groups, such as alkyl-substituted cycloalkyl groups and cycloalkyl-substituted alkyl groups. In complex structures, the chains may be branched, bridged, or cross-linked It is an object of this invention to provide a method, which is easily carried out and easily applied using conventional and commercially available application equipment. The present invention also permits to decrease the detrimental effect of fungicide and herbicides that impact negatively germination rate and growth of plants.

In one embodiment, described herein are dry or semi-dry coating compositions that promote seedling establishment and plant growth as one or more layers of the coating composition aids as a carrier or retention agent for active ingredients such as fertilizers, pesticides and the like, e.g., improved adhesion of any pesticidal formulation. In one embodiment, the dry or semi-dry coating composition aids in the ability to maintain the distribution of said pesticides, fertilizers, herbicides, etc. during the application of the treatment. In one embodiment, the at least one layer is comprised of several binders. For example, a layer can be comprised of at least two binders (a first binder, second binder), or can be comprised of at least three binders (a first binder, a second binder, a third binder, etc.), or can be comprised of at least four binders (a first binder, a second binder, a third binder, a fourth binder, a fifth binder, a sixth binder, etc.).

In one embodiment, the seed is coated with a dry coating composition coating all or part of the seed or seedling. In some embodiments, the seed has a shelf-life at room temperature in ambient conditions in an unsealed container without added salts or adjuvants of at least two months. The composition can further comprise another binder selected from molasses, granulated sugar, alginates, karaya gum, tragacanth gum, polysaccharide gum, mucilage or any combination thereof.

In other embodiments, the binder is selected from the group consisting of gelatin, polyvinyl acetates, copolymers of polyvinyl acetate monomer with another monomer, polyvinyl alcohols, copolymers of polyvinyl alcohol monomer with another monomer, celluloses selected from the group consisting of ethylcelluloses and methylcelluloses, hydroxypropylcelluloses, hydroxymethyl celluloses, and hydroxymethylpropyl-celluloses, polyvinylpyrolidones, dextrins, polysaccharides, fats, oils, proteins, gum arabics, shellacs, vinylidene chloride, vinylidene chloride copolymers, calcium lignosulfonates, copolymers of acrylic monomers with another monomer, underivatized starch, derivatized starch, cationic starch, polyvinylacrylates, zeins, carboxymethylcellulose, chitosan, polyethylene oxide, acrylimide polymers and copolymers of acrylimide monomer with another monomer, polyhydroxyethyl acrylate, methylacrylimide monomers, ethylcellulose, polychloroprene, and any combination thereof.

In one embodiment, the layer, second binder or further additional component comprises guar, derivatized guar, polyacrylamide, poly(methacrylic acid), poly(acrylic acid), polyacrylate, poly(ethylene glycol), phosphonate-end capped polymers, polyethyleneoxide, poly(vinyl alcohol), polyglycerol, polytetrahydrofuran, polyamide, cationic hydroxypropyl guar, hydroxypropyl guar, cationic carboxymethyl guar, carboxymethylhydroxypropyl guar, starch, derivatized starch, cationic starch, corn starch, wheat starch, rice starch, potato starch, tapioca, waxy maize, *sorghum*, waxy sarghum, sago, dextrin, chitin, chitosan, alginate compositions, xanthan gum, carageenan gum, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing and a combination of any of the foregoing.

Also described herein are dry seed coating compositions that promote seedling establishment as one or more of the layers of the seed coating composition can act as an antibacterial agent. Also described herein are dry seed coating compositions that promote seedling establishment, wherein the seed coating comprises multiple layers, each layer individually capable of providing one or more of the benefits as described herein.

Also described herein are dry seed coating compositions wherein one or more layers comprise guars or guar derivatives as improved film-formation agents that can likewise act as a binding agent, where the guar or guar derivatives can be utilized as a film former, a binder or a combination of both. In one embodiment, the dry seed coating compositions described herein are substantially uniform in diameter such that flow of the seeds during application (e.g., spraying) is improved.

The promotion of seedling establishment can minimize yield loss of crops, grasses, shrubs and the like, can maintain and improve the quality of the seeds and can help to avoid the spread of harmful organisms.

In one embodiment, the invention relates to compositions and methods related to seedling establishment, which has an impact on improving yield of crops, as well as agricultural and horticultural plants, shrubs, trees, grasses and the like. In one embodiment, the invention relates to compositions and methods related to prevention of agricultural compounds, such as pesticides, fertilizers, herbicides, and the like, lost to water runoff or drainage (wherein when lost to runoff or drainage, such agricultural compounds are not available for grass and plants and the like).

Applications targeted include agricultural uses to increase the yield of crops or to secure the crop in very hostile areas (non-irrigated zones, warm to hot climates, windy areas, scarce precipitation, or a combination of these). Some targeted markets include: agriculture for non-irrigated crops (including but not limited to wheat, cotton, etc.); agriculture for irrigated crops (including but not limited to horticulture-based plants); arboriculture, forestry and gardening; golf courses; sport and park turf; seeding additive for plant nurseries; and fruits, among others.

In one aspect, described herein are dry coating compositions comprising at least one seed and at least one layer coating all or part of the seed, the layer having at least one binder selected from: guar, derivatized guar, polyacrylamide, poly(methacrylic acid), polyvinylpyridine, polyvinylpyrrolidone, poly(acrylic acid), polyacrylate, poly(ethylene glycol), phosphonate-end capped polymers, polyethyleneoxide, poly(vinyl alcohol), polyglycerol, polytetrahydrofuran, polyamide, hydroxypropyl guar, carboxymethyl guar, carboxymethylhydroxypropyl guar, starch, derivatized starch, cationic starch, corn starch, wheat starch, rice starch, potato starch, tapioca, waxy maize, *sorghum*, waxy sarghum, sago, dextrin, chitin, chitosan, alginate compositions, xanthan gum, carageenan gum, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing and a combination of any of the foregoing. The derivatized guar, in one embodiment, is cationic guar. In one embodiment, suitable cationic guar derivatives include cationically modified polymers such as guar and hydroxypropyl guar and alkyl guar, more typically cationic hydroxylpropyl guar, as well as salts thereof. A typical cationic functional group in these cation guar derivatives is trimethylamino(2-hydroxyl)propyl, with chloride as the counter ion. It is understood, however, that various counter ions can be utilized, including but not limited to halides (e.g., chloride, fluoride, bromide, iodide), sulfate, methylsulfate, and mixtures thereof.

The derivatized guar, in one embodiment, is cationic guar. In one embodiment, suitable cationic guar derivatives include cationically modified polymers such as guar and hydroxypropyl guar and alkyl guar, more typically cationic hydroxylpropyl guar, as well as salts thereof. A typical cationic functional group in these cation guar derivatives is trimethylamino(2-hydroxyl)propyl, with chloride as the counter ion. It is understood, however, that various counter ions can be utilized, including but not limited to halides (e.g., chloride, fluoride, bromide, iodide), sulfate, methylsulfate, and mixtures thereof. In other embodiments, suitable cationic guar derivatives include cationically modified alkylated carboxylated polymers such as methyl and ethyl carboxymethyl guar and cationic hydroxypropyl guar, more typically cationic hydroxypropyl guar.

In one embodiment, the seed coating composition can also comprise a binder. The binder (or any of the layers) can be molasses, granulated sugar, alginates, karaya gum, jaguar gum, tragacanth gum, polysaccharide gum, mucilage, gelatin, polyvinyl acetates, polyvinyl acetate copolymers, polyvinyl alcohols, polyvinyl alcohol copolymers, celluloses (including ethylcelluloses and methylcelluloses, hydroxypropylcelluloses, hydroxymethyl celluloses, hydroxymethylpropyl-celluloses), polyvinylpyrolidones, dextrins, maltodextrins, polysaccharides, fats, oils, proteins, gum arabics, shellacs, vinylidene chloride, vinylidene chloride copolymers, calcium lignosulfonates, acrylic copolymers, starches, derivatized starches, polyvinylacrylates, zeins, carboxymethylcellulose, chitosan, polyethylene oxide, acrylimide polymers and copolymers, polyhydroxyethyl acrylate, methylacrylimide monomers, alginate, ethylcellulose, polychloroprene, syrups or any combination thereof.

In one embodiment, the layer is comprised of at least a first binder comprising a crosslinked biopolymer or un-crosslinked biopolymer. In one embodiment, the biopolymer is a starch, which can be amylose, amylopectin, or a combination thereof. In some embodiments, the starch is crosslinked, typically, internally crosslinked. In further embodiments, the internally crosslinked starch (including amylose and amylopectin) is made up of particles having an average particle size under 400 nm. In another embodiment, the internally crosslinked starch (including amylose and amylopectin) is made up of particles having an average particle size in the range of 50 to 150 nm. The product can be in the form of a dry powder of agglomerated nanoparticles with a volume mean diameter of about 300 microns.

The crosslinking agents utilized can include but are not limited to copper compounds, magnesium compounds, borax, glyoxal, zirconium compounds, titanium compounds (for example, titanium IV compounds such as titanium lactate, titanium malate, titanium citrate, titanium ammonium lactate, polyhydroxy complexes of titanium, titanium triethanolamine, and titanium acetylacetonate), calcium compounds, aluminum compounds (such as, for example, aluminum lactate or aluminum citrate), p-benzoquinone, dicarboxylic acids and their salts, phosphite compounds and phosphate compounds. In another embodiment, the crosslinking agent is a chemical compound containing a polyvalent ion such as, but not necessarily limited to, boron or a metal such as chromium, iron, aluminum, titanium, antimony and zirconium, or mixtures of polyvalent ions. In another embodiment, crosslinking agent is a polyacid comprising at least two acidic functional groups reacting with the alcohol moieties on the starch particles. In one embodiment, the polyacid is nonpolymeric. The polyacids can include at least one of citric acid, glutaric acid, maleic acid, succinic acid, phthalic acid, malic acid, phthalic acid or the like, and salts thereof.

In another embodiment, the crosslinking agent is selected from dialdehydes, polyaldehydes, anhydrides, glutaraldehyde, glyoxal, oxidized carbohydrates, periodate-oxidized carbohydrates, epichlorohydrin, distarch phosphate, epoxides, triphosphates, borax, isocyanates, and silicates such as tetraethyl orthosilicate (TEOS). In one embodiment, the crosslinking agent is a mixture of crosslinking agents.

In one embodiment, the crosslinking agent can used at between 0.1 and 10 weight % with respect to the total dry weight of the curable aqueous composition, and, in another embodiment, between 0.1 and 5 weight % with respect to the total dry weight of the curable aqueous composition. In yet another embodiment, the crosslinking agent can be used between 0.5 and 5 weight % with respect to the total dry weight of the curable aqueous composition, or between 0.1 and 2 weight % with respect to the total dry weight of the curable aqueous composition.

In another embodiment, the seed coating composition contains at least one active ingredient. The active ingredient can be one or more herbicides, plant growth regulators, crop dessicants, fungicides, bacteriocides, bacteriostats, insecticides, insect repellants, triazine herbicides, sulfonylurea herbicides, uracils, urea herbicides, acetanilide herbicides, organophosphonate herbicides, glyphosate salts, glyphosate esters, nitrilo oxime fungicides, imidazole fungicides, triazole fungicides, sulfenamide fungicides, dithio-carbamate fungicides, chloronated aromatic, dichloro aniline fungicides, carbamate insecticides, organo thiophosphate insecticides; perchlorinated organic insecticides, methoxychlor, miticides, propynyl sulfite, triazapentadiene miticides, chlorinated aromatic miticides, tetradifan, dinitrophenol miticides, binapacryl, adjuvants, surfactants, fertilizers or any mixture thereof.

In one embodiment, the layer comprises guar or a guar derivative. Guar derivatives include but are not limited to, carboxymethyl guar, hydroxyethyl guar, hydroxypropyl guar, carboxymethylhydroxypropyl guar, cationic guar, cationic hydroxypropyl guar, carboxymethyl guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, hydrophobically modified cationic guar, or any combination thereof. In another embodiment, the seed coating composition can optionally comprise a filler.

In one embodiment, the seed is of the crop or plant species including but not limited to corn (*Zea mays*), *Brassica* sp. (e.g., *B. napus, B. rapa, B. juncea*), alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus animus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Cofea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), oats, barley, vegetables, ornamentals, woody plants such as conifers and deciduous trees, squash, pumpkin, hemp, zucchini, apple, pear, quince, melon, plum, cherry, peach, nectarine, apricot, strawberry, grape, raspberry, blackberry, soybean, sorghum, sugarcane, rapeseed, clover, carrot, and *Arabidopsis thaliana*.

In one embodiment, the seed is of any vegetables species including but not limited to tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), cauliflower, broccoli, turnip, radish, spinach, asparagus, onion, garlic, pepper, celery, and members of the genus *Cucumis* such as cucumber (*C. sativus*), cantaloupe (*C. cantalupensis*), and musk melon (*C. melo*).

In one embodiment, the seed is of any ornamentals species including but not limited to hydrangea (*Macrophylla hydrangea*), hibiscus (*Hibiscus rosasanensis*), petunias (*Petunia hybrida*), roses (*Rosa* spp.), azalea (*Rhododendron* spp.), tulips (*Tulipa* spp.), daffodils (*Narcissus* spp.), carnation (*Dianthus caryophyllus*), poinsettia (*Euphorbia pulchenima*), and chrysanthemum.

In one embodiment, the seed is of any conifer species including but not limited to conifers pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*), Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*).

In one embodiment, the seed is of any leguminous plant species including but not limited beans and peas. Beans include guar, locust bean, fenugreek, soybean, garden beans, cowpea, mungbean, lima bean, fava bean, lentils, chickpea, pea, moth bean, broad bean, kidney bean, lentil, dry bean, etc. Legumes include, but are not limited to, *Arachis*, e.g., peanuts, *Vicia*, e.g., crown vetch, hairy vetch, adzuki bean, mung bean, and chickpea, *Lupinus*, e.g., lupine, *trifolium*, *Phaseolus*, e.g., common bean and lima bean, *Pisum*, e.g., field bean, *Melilotus*, e.g., clover, *Medicago*, e.g., alfalfa, *Lotus*, e.g., trefoil, lens, e.g., lentil, and false indigo. Typical forage and turf grass for use in the methods described herein include but are not limited to alfalfa, orchard grass, tall fescue, perennial ryegrass, creeping bent grass, *lucerne*, birdsfoot trefoil, clover, *stylosanthes* species, *Lotononis bainessii*, sainfoin and redtop. Other grass species include barley, wheat, oat, rye, orchard grass, guinea grass, *sorghum* or turf grass plant.

In another embodiment, the seed is selected from the following crops or vegetables: corn, wheat, *sorghum*, soybean, tomato, cauliflower, radish, cabbage, canola, lettuce, rye grass, grass, rice, cotton, sunflower and the like. In another embodiment, the seed is selected from corn, wheat, barley, rice, peas, oats, soybean, sunflower, alfalfa, *sorghum*, rapeseed, sugar beet, cotton, tobacco, forage crops, linseed, hemp, grass, vegetables, fruits and flowers seeds.

It is understood that the term "seed" or "seedling" is not limited to a specific or particular type of species or seed. The term "seed" or "seedling" can refer to seed from a single plant species, a mixture of seed from multiple plant species, or a seed blend from various strains within a plant species. In one embodiment, crop seeds include but are not limited to rice, corn, wheat, barley, oats, soybean, cotton, sunflower, alfalfa, *sorghum*, rapeseed, sugarbeet, tomato, bean, carrot, tobacco or flower seeds.

The composition of the present invention may comprise one or more compounds chosen in the group consisting of: homopolymers and copolymers of cationic styrenic monomers, homopolymers and copolymers of cationic allylic monomers, homopolymers and copolymers of (meth)aciylamido cationic is monomers, homopolymers and copolymers of (meth)acrylate cationic monomers, polyvinylamine, cationic polyacrylamide, cationic polyvinyl alcohol, Poly-quaternium-2; poly-ureylene ammonium salt, cationic starch, cationic cellulose, cationic hydroxyl-ethyl cellulose, cationic xanthan gum, cationic carageenan gum, cationic karaya gum, cationic arabic gum, cationic *tara* gum, cationic canafen gum, cationic *cassia* gum, cationic konjac gum, cationic daincha, cationic fenugreek gum, cationic locust bean gum, cationic psyllium seed gum, cationic konjak, cationic mesquite gum, cationic ivory nut mannan gum, cationic alginate, cationic *agar*, cationic ulvane, cationic tragacanth gum, cationic ghatti gum, cationic tamarind gum, cationic xyloglucan, cationic inulin, cationic proteins, cationic pectin and cationic hemicellulose. Cationic compound are preferably cationic galactomannan, notably chosen in the group consisting of: cationic fenugreek gum, cationic *tara* gum, cationic locust bean gum, and cationic *cassia* gum.

*Cassia* gum is usually a food additive made from the endosperm of *Senna obtusifolia* (also called *Cassia obtusifolia* or *Cassia tora*). It is used as a thickener and gelling agent, and has E-number E427. *Cassia* gum may also be a *Cassia angustifolia* seed gum, known to be an effective natural coagulant for decolourisation of dye solutions. *Cassia* gum is mainly constituted of galactomanna with a mannose:galactose number ratio is about 5:1.

Fenugreek gum is a galactomannan extracted for the seeds of the fenugreek plant, *Trigonella Foenum*-Gracecum, Fenugreek gum is a non gelling hydrocolloid, which is soluble in cold water. Galactomannans are polysaccharides consisting of a mannose backbone with galactose side groups (more specifically, a (1-4)-linked beta-D-mannopyranose backbone with branchpoints from their 6-positions linked to alpha-D-galactose, i.e. 1-6-linked alpha-D-galactopyranose). In fenugreek gum, mannose:galactose number ratio is about 1:1. Canafen® and Coyote® are known brands of fenukreek gums.

*Tara* gum is a natural additive, obtained by grinding the endosperm of the seeds of *Caesalpinia spinosa*, of the Leguminosae family. *Tara* gum, also called Peruvian carob. *Tara* gum is mainly constituted of galactomannans with a mannose:galactose number ratio is about 3:1. *Tara* gum is also known with the following CAS reference: CAS No.39300-88-4.

Starch or amylum is a carbohydrate consisting of a large number of glucose units joined by glycosidic bonds. Cationic starch may be produced according to U.S. Pat. No. 4,464,528.

Cellulose is an organic compound with the formula $(C_6H_{10}O_5)_n$, polysaccharide consisting of a linear chain of several hundred to over ten thousand β (1→4) linked D-glucose units.

Konjac gum is obtained from *Amorphophallus konjac* and mainly comprises glucomannan, known to be a food additive used as an emulsifier and thickener. Glucomannan is mainly a straight-chain polymer, with a small amount of branching The component sugars are β-(1→4)-linked D-mannose and D-glucose in a ratio of 1.6:1.

Locust bean gum is a galactomannan vegetable gum extracted from the seeds of the carob tree, mostly found in the Mediterranean region. Locust bean gum is mainly constituted of galactomannans with a mannose:galactose number ratio is about 4:1. Locust bean gum is also known with the following CAS reference: CAS No. 9000-40-2.

Cationic compound of the invention may include compounds that may be obtained by the use of different possible cationic etherifying agents, such as for example the family of ammonium salts, notably quaternary ammonium salts, phosphonium salts and sulfonium salts.

In the case of cationic compounds, the cationic group may be then an amine group (primary, secondary or tertiary) or a quaternary ammonium group bearing four radicals, which may be identical or different, chosen an alkyl radical containing from 1 to 22 carbon atoms, more particularly from 1 to 14 and advantageously from 1 to 3 carbon atoms. The counterion is generally a halogen, which is one embodiment is chlorine, or nitrate.

Suitable quaternary ammonium compounds may be those conforming to the general Formula (I):
wherein where R1, R2 and R3 are methyl or ethyl groups;
R4 is either an epoxyalkyl group of the general Formula (II):
or R4 is a halohydrin group of the general Formula
wherein R3 is a C1 to C3 alkylene; X is chlorine or bromine, and Z is an anion such as Cl, Br, I or HSO4.

Quaternary ammonium salts may be for example:
3-chloro-2-hydroxypropyl trimethyl ammonium chloride (CHPTMAC), 2,3-epoxypropyl trimethyl ammonium chloride (EPTAC), and diallyldimethyl ammonium chloride (DMDAAC).

A typical cationic functional group in these cationic compounds is trimethylamino(2-hydroxyl)propyl, with a counter ion. Various counter ions can be utilized, including but not limited to halides, such as chloride, fluoride, bromide, and iodide, sulfate, methyl sulfate, nitrate, and mixtures thereof.

Cationic compounds of the present invention may be chosen in the group consisting of:
 a. homopolymers and copolymers of cationic styrenic monomers, such as vinylbenzyl trimethyl ammonium chloride,
  b. homopolymers and copolymers of cationic allylic monomers, such as diallyldimethyl ammonium chloride, and poly DMDAAC,
   c. homopolymers and copolymers of (meth)acrylamido cationic monomers, such as acrylamidopropyltrimonium chloride, and polyMAPTAC,
   d. homopolymers and copolymers of (meth)acrylate cationic monomers, such as trimethylammonium ethyl acrylate, polyADAME quat or trimethylammonium ethyl methacrylate, and poly MADAME quat.

Cationic compounds of the present invention may be preferably chosen in the group consisting of: 2,3-hydroxypropyl trimethyl ammonium chloride, vinylbenzyl trimethyl ammonium chloride, diallyidimethyl ammonium chloride, acrylamidopropyltrimonium chloride, trimethylammonium ethyl (meth) acrylate chloride.

The degree of hydroxyalkylation (molar substitution or MS) of cationic compounds, that is the number of alkylene oxide molecules consumed by the number of free hydroxyl functions present on the compounds, may be comprised between 0 and 3, preferably between 0 and 1.7. As example, a MS of 1 may represent one propylene oxide unit per repeating monomer unit.

The Degree of Substitution (DS) of cationic compounds, that is the average number of hydroxyl groups that have been substituted by a cationic group per monosaccharide unit, may be comprised between 0.005 and 3, preferably between 0.01 and 2, more preferably between 0.05 and 0.15. DS may notably represent the number of the cationic groups per repeated monomer unit. DS may notably be determined by titration.

The Charge Density (CD) of cationic compounds may be comprised between is 0.1 and 10 meq/g, preferably between 0.4 and 6 meq/g. The charge density refers to the ratio of the number of positive charges on a monomeric unit of which a polymer is comprised to the molecular weight of said monomeric unit. The charge density multiplied by the polymer molecular weight determines the number of positively charged sites on a given polymer chain.

Specific cationic compounds may have an average Molecular Weight (Mw) of between about 20,000 daltons and 20,000,000 daltons. This notably the case for cationic compounds such as poly diallyldimethyl ammonium chloride (pol)1 DMDAAC), polymethacrylamidopropyltrimonium chloride, polyMAPTAC, Polyquatemium-2, and polyureylene ammonium salt.

The cationic compounds may also have an average Molecular Weight (Mw) of between about 100,000 daltons and 3,500,000 daltons, preferably between about 500,000 daltons and 3,500,000 daltons.

The seed coating composition may also comprise a binder. The binder (or any of the layers) can be molasses, granulated sugar, alginates, karaya gum, jaguar gum, tragacanth gum, polysaccharide gum, mucilage, gelatin, polyvinyl acetates, polyvinyl acetate copolymers, polyvinyl alcohols, polyvinyl alcohol copolymers, styrene acrylate polymers, styrene butadiene polymers, polyurethanes, celluloses (including ethylcelluloses and methylcelluloses, hydroxypropylcelluloses, hydroxymethyl celluloses, hydroxymethylpropyl-celluloses), polyvinylpyrolidones, dextrins, malto-dextrins, polysaccharides, fats, oils, proteins, gum arabics, shellacs, vinylidene chloride, vinylidene chloride copolymers, calcium lignosulfonates, acrylic copolymers, starches, derivatized starches, polyvinylacrylates, zeins, carboxymethylcellulose, chitosan, polyethylene oxide, acrylimide polymers and copolymers, polyhydroxyethyl acrylate, methylacrylimide monomers, alginate, ethylcellulose, polychloroprene, syrups or any combination thereof.

The seed coating composition may contain also surfactants, antioxidants, plasticizers, colorants, fillers, drying powder type silica (including fumed or precipitated silica), kaolin, talc, or a mixture thereof.

In another embodiment, the seed coating composition contains at least one active ingredient. The active ingredient can be one or more herbicides, plant growth regulators, crop dessicants, fungicides, bacteriocides, bacteriostats, microorganisms, insecticides, insect repellants, triazine herbicides, sulfonylurea herbicides, uracils, urea herbicides, acetanilide herbicides, organophosphonate herbicides, glyphosate salts, glyphosate esters, nitrilo oxime fungicides, imidazole fungicides, triazole fungicides, sulfenamide fungicides, dithiocarbamate fungicides, chloronated aromatic, dichloro aniline fungicides, carbamate insecticides, organo thiophosphate insecticides; perchlorinated organic insecticides, methoxychlor, miticides, propynyl sulfite, triazapentadiene miticides, chlorinated aromatic miticides, tetradifan, dinitrophenol miticides, binapacryl, molluscicides, bactericides, repellents or any mixture thereof. In one embodiment, the microorganism include but are not limited to gram positive bacteria, gram negative bacteria, including rhizobia and bacillus type bacteria, as well as fungi including trichoderma.

According to an embodiment of the present invention, the seeding composition comprises at least a cationic compounds and a plant biostimulant. Plant biostimulants are usually components other than fertilizers that affect plant growth and/or metabolism upon foliar application or when added to soil. Plant biostimulants generally fall within one of three categories: hormone-containing products, amino acid-containing products and humic acid-containing products. Plant biostimulants are used to treat crops in a commercial setting in view of their ability to, for example, increase growth rates, decrease pest plant growth, increase stress tolerance, increase photosynthetic rate, and increase disease tolerance. Plant biostimulants are generally believed to operate by up-regulating or down-regulating plant hormones.

The seed coating composition may also contain pigments, adjuvants, surfactants, and/or fertilizers. The seed coating composition may contain also nutrients, fertilizers or biological additives, such as inoculants type bacteria or fungi, or a mixture thereof. The seed coating composition may be a liquid or solid composition, notably a powder. Suitable coating techniques may be utilized to coat the seeds or agglomeration of seed of the seed coating compositions described herein. Equipment that may be utilized for coating can include but are not limited to drum coaters, rotary coaters, tumbling drums, fluidized beds and spouted beds, but any suitable equipment or technique may be employed. The seeds may be coated via a batch or continuous coating process.

Process

In a first embodiment, the invention also concerns a method to increase the growth of a plant by coating a seed of said plant with a composition comprising at least one of the above mentioned compounds in a first step and then in a second step to apply the coated seed onto or in the soil; notably in order to set in contact the coated seed with the ground.

In another embodiment, the invention also concerns a method to increase the growth of a plant in which it's perfectly possible to set an "in situ coating" onto or in the soil; notably by implanting in a hole in the soil a raw or non-coated seed of plant and then applying a coating composition comprising at least one of the above mentioned compounds, into the hole to surround or partially surround the seed.

The seeds can be separated prior to coating which, in one embodiment, utilizes mechanical means such as a sieve. The separated seeds can then be introduced into a coating machine having a seed reservoir. In one embodiment, the seeds in the mixing bowl are combined with one or more of the coatings described herein and adhered with a binder or adhesive.

In one embodiment of the process, one or more layers can be added to coat the seed or agglomeration. Outer layers can be introduced sequentially to the rotating drum. In another embodiment, agglomerators or agglomerator devices may also be utilized. Coating is performed within a rotary coater by placing seeds within a rotating chamber, which pushes the seeds against the inside wail of the chamber. Centrifugal forces and mixing bars placed inside the coater allow the seed to rotate and mix with a coating layer. Binder or other coating materials can be pumped into the proximate center of the coater onto an atomizer disk that rotates along with the coating chamber. Upon hitting the atomizer disk, liquid adhesive is then directed outward in small drops onto the seed.

In one embodiment, seed coating techniques include, for example, including seed(s) in a rotating pan or drum. The seed is then mist with water or other liquid and then gradually a fine inert powder, e.g., diatomaceous earth, is added to the coating pan. Each misted seed becomes the center of a mass of powder, layers, or coatings that gradually increases in size. The mass is then rounded and smoothed by the tumbling action in the pan, similar to pebbles on the beach. The coating layers are compacted by compression from the weight of material in the pan. Binders often are incorporated near the end of the coating process to harden the outer layer of the mass. Binders can also reduce the amount of dust produced by the finished product in handling, shipping and sowing. Screening techniques, such as frequent hand screening, are often times utilized to eliminate blanks or doubles, and to ensure uniform size. For example, tolerance for seed coating compositions described herein can be +/−1/64th inch (0.4 mm), which is the US seed trade standard for sizing, established long before coatings were introduced. For example, coated lettuce seed is sown most frequently with a belt planter through a 13/64 inch diameter round holes in the belt. This hole size requires that the seed coating compositions comprising lettuce seeds can be sized over a 7.5/64 inch screen and through an 8.5/64 inch screen.

In another embodiment, the seed coating compositions and methods described herein comprises "in situ coating". In situ coating means, in one embodiment, where a raw or non-coated seed is implanted in a hole in the ground and immediately or soon thereafter a coating composition is sprayed or applied directly into the hole to surround or partially surround the seed. According to the invention the hole may notably be a hole, a cavity or a hollowed area. Typically, the application of the seed as well as application of the coating composition are performed mechanically, but is understood that either or both of the referenced applications can be performed manually as well.

In one embodiment, the polymer or binder comprising a layer has a weight average molecular weight of between about 5,000 daltons and 500,000 daltons. In another embodiment, the polymer has a weight average molecular weight of between about 200,000 daltons and 1,000,000 daltons. In another embodiment, the soil additive is a polymer having a weight average molecular weight of up to about 5,000,000 daltons. In another embodiment, the soil additive is a polymer having a weight average molecular weight of up to about 25,000,000 daltons. In a further embodiment, the soil additive is a polymer having a weight average molecular weight of up to about 50,000,000 daltons.

The binders or polymers as described herein may also be cross-linked or non-crosslinked, or to some degree a combination of both. In some embodiments, one or more layers described herein can act as a "film-coating", typically, a guar or guar derivative comprising layer. A thin film can smooth the surface of the seed coating composition for better flow ability. The film-coating also influences water uptake and the adherence of additional ingredients, such as for example chemical fungicide treatments. In some embodiments, film coating only increases the raw weight of the seed or agglomerates 1% to 5%, far less than traditional powder coatings. In some embodiments, up to 10%, in other embodiment up to 25%, up to, 15%, 40%, 50%.

In another embodiment, a film-coating layer, which can comprise guar or a guar derivative such as a cationic guar, can prevent the moisture from leaving the seed. Such a film-coating layer can extend the shelf-life of the seed. "Shelf-life" of a seed, as the term is used herein, is measured at room temperature in ambient conditions in an unsealed container without added salts or adjuvants. In a first embodiment, the film-coating layer extends the shelf-life of a seed by at least two months, in other embodiments, by at least three months, in yet other embodiments, by at least four months, in further embodiments, by at least six months, in other embodiments, by at least eight months, in yet other embodiments, by at least twelve months, and in other embodiments, by at least eighteen months. Every seed has a shelf-life, depending on individual characteristics such as size and other seed characteristics, which coincides with a seed's dormant state. (Normally, in dormant state, but there has to be minimum water content to sustain the seed in such a state.) For example, grass seeds have a shelf-life of about one year before the seeds are generally no longer viable. In other words, the dry seed coating compositions described herein can promote the survival rate of the seed.

In yet another embodiment, the film-coating layer can act as barrier against water loss from the seed. This, in turn, can promote the survival rate of the seed. In another embodiment, it is believed the film-coating layer can act as an anti-bacterial agent, which in particular is a derivatized guar, specifically cationic guar. Such a cationic guar typically takes a longer time to degrade than other layers or coating layers. In addition, once such a cationic guar film-coating layer degrades, in its degraded state, the cationic guar is able to kill bacteria or inhibit the growth of bacteria.

In other embodiments, the seed coating composition can also comprise a nutrient such as a micronutrient or macronutrient. The nutrient can comprise one or more layers of the seed coating composition, as well as comprise all or part of a layer. The nutrient can also be included with the grouping of seeds as part of the binder or adhesive. "Nutrient" as used herein can refer to an additive or substance utilized by plants, grasses, shrubs for plant, grass, and shrub growth, respectively. Macronutrients can be utilized in larger amounts by plants, grasses, etc. in proportionally larger amounts relative to micronutrients. Nutrients include but are not limited to manganese, boron, copper, iron, chlorine, molybdenum, and zinc, potassium, nitrogen, calcium, magnesium phosphorus and sulfur, among others. Compositions of the present invention can include various combinations and relative amounts of individual macronutrients. In some embodiments, the layer can act as a carrier coating. Fungicides and beneficial microbials that protect the seed and emerging seedling are carried in the carrier coating. For example, alfalfa seed coating with incorporated rhizobacteria is used to inoculate the field with beneficial microbial.

In one embodiment, a seed is typically coated when the non-coated or raw seed is too small, light or variable in shape or size to be sown accurately with equipment currently used. Thus, it is desirable for farmers, growers, etc. to be able to precisely sow a crop. Such precision sowing is desirable when growers need strict control of spacing or depth of placement. This is also important for crops that are direct sown and then thinned back to the desired population, i.e., field thinning. Incidence of "skips" or "doubles" can be reduced and seedlings can be more accurately spaced (for example, with a deviation of less than 0.5 inches on center in the row as opposed to traditional techniques with deviations of greater than several inches). In some instances, it is desirable to agglomerate two or more seeds to create a uniform size for improved or efficient sowing.

An aspect of the invention includes agglomerates of seed. The agglomerate or grouping of seed, in one embodiment, is a grouping of 2 or more individual seeds together. In another embodiment, the agglomerate is a grouping of more than 5 individual seeds together. In a further embodiment, the agglomerate is a grouping of more than 10 individual seeds together. In yet another embodiment, the agglomerate is a grouping of more than 25 individual seeds together. In yet a further embodiment, the agglomerate is a grouping of more than 50 individual seeds together. In another embodiment, the agglomerate is a grouping of more than 100 individual seeds together.

In one embodiment, the seed coating composition is of substantially uniform size of from between 10 micrometers and 4 mm in diameter. In another embodiment, the seed coating composition is of substantially uniform size of from between 25 micrometers and 2 mm in diameter. In a further, the seed coating composition is of substantially uniform size of from between 500 micrometers and 2 mm in diameter.

The following examples are included to illustrate embodiments of the invention, but is not limited to described examples.

EXAMPLES

Example 1

DV-89 is a biopolymer latex, more particularly an internally crosslinked starch (including amylose and amylopectin) particles having an average particle size under 400 nm. The product is provided in the form of a dry powder of agglomerated nanoparticles with a volume mean diameter of about 300 microns. When mixed in water and stirred, the agglomerates break apart and form a stable dispersion of the nanoparticles.

DV-12 is a biopolymer latex, more particularly an internally crosslinked starch (including amylose and amylopectin) particles having an average particle size in the range of 50 to 150 nm. The product is provided in the form of a dry powder of agglomerated nanoparticles with a volume mean diameter of about 300 microns.

When mixed in water and stirred, the agglomerates break apart and form a stable dispersion of the nanoparticles. Both are capable of replace petroleum-based latex binders in industrial applications, including agricultural applications. Generally, the products are in the form of a dry powder of agglomerated nanoparticles with a volume mean diameter of about 300 microns. When mixed in water and stirred, the agglomerates break apart and are able to form a stable dispersion of the nanoparticles.

Dispersions of starch particle DV-12 and DV-89 in demineralized water were prepared. The dispersion concentration was equal to 10% for DV-12 and to 3% for DV-89. A styrene acrylic latex dispersion (SAL) was utilized as a benchmark: a dispersion of styrene acrylic latex at 3% in demineralized water was prepared. Corn seeds were treated with the three different latex using a Norogard R150 seed coater as follows: weight seeds and introduce them into the seed coater chamber, turn on seed coater (300 rpm), after 5 seconds introduce binder latex, turn off seed coater (after 15 seconds of rotation) and discharge the treated seeds. The latex rate was set at 0.02% wt on seeds for the three latexes.

The coating processability of the three latex was evaluated through three criteria: caking, wetness and residual/residue.

Caking evaluation was evaluated with the following protocol: a solid container was filled with freshly treated seeds, the container is kept at rest for 15 minutes without any mechanical disturbance, after 15 minutes the container is tilted until the seeds start to flow and the formation of any seed aggregates is monitored. If no aggregates are formed the test results is PASS, if some seeds aggregates are observed the rest results is NOT PASS.

For wetness criteria, the seeds were observed just after treatment and their wetness was visually evaluated ranging from: dry, slightly wet and wet.

For residual (or reside) criteria, the seed coater chamber just after treatment was observed to qualitatively evaluate the amount of residual ranging from: no residual, slightly residual, high amount of residual. The results of the caking tests, wetness and residuals observations are presented in Table 1.

As shown in Table 1, no caking issue were observed for SAL and DV-12. For DV-89, a few aggregates of seeds were observed without being an obstacle for a seed coating application. After treatment, it was observed that all the seeds were slightly wet; however, more residual was observed in the seed coater chamber after the treatment for SAL (benchmark) than for the two starch based binders, DV-12 and DV-89. All the three latex tested were able to coat seeds easily.

TABLE 1

|  | DV-12 | DV-89 | SAL (Benchmark) |
| --- | --- | --- | --- |
| Caking result | PASS | Slight caking | PASS |
| Wetness result | Slightly wet | Slightly wet | Slightly wet |
| Residual result | No residual | No residual | Slightly residual |

Dust measurements were also performed on the seeds treated with the three latex with a Heubach dustmeter equipment. Treated seeds are introduced in the metal drum of the Heubach device, the drum is then reassembled and connected to the glass cylinder. A glass fiber filter disc is placed in the filter unit, the filter unit is then weighted and after placed on the glass cylinder and connected to the vacuum tube. The drum is put in rotation (30 rpm). The vacuum pump creates an air flow through the rotating drum, by the air flow the abraded dust particle are transported out of the rotating drum through the glass cylinder and the filter unit. At the end of the rotation, the filter unit is removed from the glass cylinder and weight. The Heubach dust value is expressed in g/100 kg of treated seeds and is calculated as the ratio of the weight difference of the filter unit after and before the test and the weight of treated seeds. The test is performed twice, the final results is the mean of the two measurements. The settings of the Heubach equipment are set as follows: rotation speed 30 rpm, rotation time 120 seconds and airflow rate 20 L/min. The dust measurements are performed on seeds treated with the three latex and on untreated seeds. The results are summarized in Table 2.

TABLE 2

| Binder | Dust level (g/100 kg) |
| --- | --- |
| Control | 1.23 |
| DV-12 | 0.60 |
| DV-89 | 0.03 |
| SAL (Benchmark) | 0.30 |

The three binders reduce the dust emission compared to the untreated seeds. The most efficient binder, however, regarding dust reduction is DV-89.

Warm germination test on paper following AOSA standard were also performed to assess the innocuousness of the binder treatment for seeds. The results of the warm germination tests for seeds treated with a dispersion of SAL (benchmark), DV-12 and DV-89, and untreated seeds are presented in the Table 3. These data correspond to the final count at day 7.

TABLE 3

| | Final count at day 7 | | | |
| --- | --- | --- | --- | --- |
| | DV-12 | DV-89 | SAL (benchmark) | Untreated |
| Normal | 97% | 95.5% | 94% | 95.5% |
| Abnormal | 2% | 4% | 3.5% | 4% |
| Dead | 1% | 0.5% | 2.5% | 0.5% |

All latex samples showed no negative impact on seed safety.

Example 2

Dispersions of starch particles and guar biostimulant powder were prepared in demineralized water as follows: starch particles (DV-12 or DV-89) are dispersed in demineralized water at a concentration equals to 10%, then guar biostimulant powder is added to the dispersion to reach a final guar concentration in the dispersion equal to 19%. Two guar biostimulant powders are considered, DCG-1 and DCG-2. DCG-2, a derivatized cationic guar, is characterized as follows: Mw (Weight Average) between 1,000,000 and 2,000,000; MS of 0.4-0.6; DS of 0.1-0.16 DCG-1, a derivatized cationic guar, is characterized as follows: Mw (Weight Average) between 1,800,000 and 2,500,000; MS of 0.56-0.74; DS of 0.12-0.19. In total 4 formulations are prepared as two different starch particle grades (DV-12 and DV-89) and two different guar biostimulant powders (DCG-1 and DCG-2) are considered. Corn seeds were treated with the four different formulations using a Norogard R150 seed coater as follows: weight seeds and introduce them into the seed coater chamber, turn on seed coater (300 rpm), prepare the guar and starch dispersions, after 20 seconds of rotation of the seed coater introduce binder formulation, turn off seed coater (after 30 seconds of rotation) and discharge the treated seeds. The latex rate was set at 0.028% wt on seeds and the guar rate was set at 0.19% wt on seeds for the four different formulations.

The coating processability of the four formulations was evaluated through three criteria: caking, wetness and residual/reside.

Caking evaluation was evaluated with the following protocol: a solid container was filled with freshly treated seeds, the container was kept at rest for 15 minutes without any mechanical disturbance, after 15 minutes the container was tilted until the seeds start to flow and the formation of any seed aggregates is monitored. If no aggregates were formed the test results is PASS, if some seeds aggregates were observed, the rest results is NOT PASS.

For wetness criteria, the seeds were observed just after treatment and their wetness was visually evaluated ranging from: dry, slightly wet and wet.

For residual (or residue) criteria, the seed coater chamber just after treatment was observed to qualitatively evaluate the amount of residual ranging from: no residual, slightly residual, high amount of residual.

The results of the caking tests, wetness and residuals observations are presented in Table 4. From the 4 formulations tested with starch binder and guar biostimulant powder, no caking issues were observed. After treatment, all the seeds were dry and no residuals were observed in the seed coater chamber.

TABLE 4

| | DV-12 + DCG-1 | DV-12 + DCG-2 | DV-89 + DCG-1 | DV-89 + DCG-2 |
| --- | --- | --- | --- | --- |
| Caking result | PASS | PASS | PASS | PASS |
| Wetness result | Dry | Dry | Dry | Dry |
| Residual result | No residual | No residual | No residual | Slightly residual |

Dust measurements were also performed on the seeds treated with the four formulations with a Heubach dustmeter equipment. Treated seeds are introduced in the metal drum of the Heubach device, the drum is then reassembled and connected to the glass cylinder. A glass fiber filter disc is placed in the filter unit, the filter unit is then weighted and after placed on the glass cylinder and connected to the vacuum tube. The drum is put in rotation (30 rpm). The vacuum pump creates an air flow through the rotating drum, by the air flow the abraded dust particle are transported out of the rotating drum through the glass cylinder and the filter unit. At the end of the rotation, the filter unit is removed from the glass cylinder and weight. The Heubach dust value is expressed in g/100 kg of treated seeds and is calculated as the ratio of the weight difference of the filter unit after and before the test and the weight of treated seeds. The test is performed twice, the final results is the mean of the two measurements. The settings of the Heubach equipment are set as follows: rotation speed 30 rpm, rotation time 120 seconds and airflow rate 20 L/min. The dust measurements are performed on seeds treated with the four formulations and on untreated seeds. The results are summarized in Table 5.

TABLE 5

| Binder | Dust level (g/100 kg) |
| --- | --- |
| Control | 1.23 |
| DV-12 + DCG-1 | 0.03 |
| DV-12 + DCG-2 | 0.23 |
| DV-89 + DCG-1 | 0.00 |
| DV-89 + DCG-2 | 1.03 |

The four seed treatment formulations reduce the dust emission compared to the untreated seeds. The most efficient binder regarding the dust reduction is the composition containing DCG-1 powder and the starch binder DV-89.

Warm germination test on paper following AOSA standard were also performed to assess the innocuousness of the different seed treatments. The results of the warm germination tests for seeds treated with the four formulations and for untreated seeds are presented in the Table 6. These data correspond to the final count at day 7.

TABLE 6

| | final count at day 7 | | | | |
| --- | --- | --- | --- | --- | --- |
| | DV-12 + DCG-1 | DV-12 + DCG-2 | DV-89 + DCG-1 | DV-89 + DCG-2 | Untreated |
| Normal | 93% | 93% | 97% | 91% | 95.5% |
| Abnormal | 5% | 4.5% | 1.5% | 6% | 4% |
| Dead | 2% | 2.5% | 1.5% | 3% | 0.5% |

All the seed treatment formulations showed no negative impact on seed safety.

Example 3

Seed treatment formulation containing two insecticide slurries, a binder, guar biostimulant powder and starch particles (DV-12) are prepared by mixing all the components by mechanical agitation. Soybean seeds were treated with the different formulations with a laboratory seed coater. The compositions of seed treatment formulations applied on seeds are detailed in Table 7.

TABLE 7

| Component | Formulation 1 | Formulation 2 |
| --- | --- | --- |
| Insecticide slurry 1 | 5 mL/kg | 5 mL/kg |
| Insecticide slurry 2 | 2 mL/kg | 2 mL/kg |
| Binder | 2 mL/kg | 2 mL/kg |
| polysaccharide | 4 g/kg | 4 g/kg |
| Dry powder | 2 g/kg | 2 g/kg |
| DV-12 | — | 1 g/kg |

Dust measurements were performed on the seeds treated with the two formulations with a Heubach dustmeter equipment. Treated seeds are introduced in the metal drum of the Heubach device, the drum is then reassembled and connected to the glass cylinder. A glass fiber filter disc is placed in the filter unit, the filter unit is then weighted and after placed on the glass cylinder and connected to the vacuum tube. The drum is put in rotation (30 rpm). The vacuum pump creates an air flow through the rotating drum, by the air flow the abraded dust particle are transported out of the rotating drum through the glass cylinder and the filter unit. At the end of the rotation, the filter unit is removed from the glass cylinder and weight. The Heubach dust value is expressed in g/100 kg of treated seeds and is calculated as the ratio of the weight difference of the filter unit after and before the test and the weight of treated seeds. The results of the dust measurements performed on seeds treated with the two formulations are detailed in Table 8.

TABLE 8

| Formulation | Dust level |
| --- | --- |
| Formulation 1 | 15.0 g/kg |
| Formulation 2 | 9.7 g/kg |

The formulation containing the starch particles as an additional binder permits to reduce the dust level by 35% compared to the formulation 1 containing only the standard binder.

It is understood that embodiments other than those expressly described herein come within the spirit and scope of the present claims. Accordingly, the invention described herein is not defined by the above description, but is to be accorded the full scope of the claims so as to embrace any and all equivalent compositions and methods.

What is claimed is:

1. A coated seed composition comprising:
   at least one seed; and
   at least one layer coating all or part of the seed, the layer comprising:
   a crosslinked biopolymer having an average particle size of less than 400 nm, wherein the crosslinked biopolymer is less than 1% wt of the at least one seed; and
   optionally, a second binder comprising guar, derivatized guar, starch, derivatized starch, or a combination of any of the foregoing,
   wherein the composition is characterized by a dust value, as measured using a Heubach dustmeter device, which is lower by at least 30% as compared to an untreated seed that does not contain the crosslinked biopolymer or the at least one layer.

2. The composition of claim 1 wherein the layer comprises the crosslinked biopolymer and the second binder.

3. The composition of claim 1 wherein the crosslinked biopolymer is amylose or amylopectin.

4. The composition of claim 1 wherein the Heubach dustmeter is set with the following parameters: rotation speed 30 rpm, rotation time 120 seconds and airflow rate 20 L/min.

5. The composition of claim 1 wherein composition is characterized by a dust value, as measured using a Heubach dustmeter device, which is lower by at least 50% as compared to an untreated seed that does not contain the crosslinked biopolymer or the at least one layer.

6. The composition of claim 1 wherein composition is characterized by a dust value, as measured using a Heubach dustmeter device, which is lower by at least 70% as compared to an untreated seed that does not contain the crosslinked biopolymer or the at least one layer.

7. The composition of claim 1 wherein composition is characterized by a dust value, as measured using a Heubach dustmeter device, which is lower by at least 90% as compared to an untreated seed that does not contain the crosslinked biopolymer or the at least one layer.

8. The composition of claim 1 wherein the seed is selected from the group consisting of corn, wheat, barley, rice, peas, oats, soybean, sunflower, alfalfa, *sorghum*, rapeseed, sugar beet, cotton, tobacco, forage crops, linseed, hemp, grass, vegetables, fruits and flowers seeds.

9. The composition of claim 1 further comprising at least one active ingredient.

10. The composition of claim 9 wherein the at least one active ingredient is selected from the group consisting of herbicides, plant growth regulators, crop dessicants, fungicides, bacteriocides, bacteriostats, microorganisms, insecticides, insect repellants, adjuvants, surfactants, fertilizers and any mixtures thereof.

11. The composition of claim 1 wherein the derivatized guar comprises carboxymethyl guar, hydroxyethyl guar, hydroxypropyl guar, carboxymethylhydroxypropyl guar, cationic guar, cationic hydroxypropyl guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, hydrophobically modified cationic guar, or any combination thereof.

12. The composition of claim 1 wherein the seed has a shelf-life at room temperature in ambient conditions in an unsealed container without added salts or adjuvants of at least two months.

13. The composition of claim 1 further comprising at least one filler.

14. The composition of claim 13 wherein the at least one filler is selected from the group consisting of wood flours, clays, activated carbon, carbohydrates, sugars, dextrins, maltodextrins, diatomaceous earth, cereal flours, wheat flour, oat flour, barley flour, calcium carbonate, calcium bentonite, kaolin, china clay, talc, perlite, mica, vermiculite, silicas, quartz powder, montmorillonite and mixtures thereof.

15. The composition of claim 1 wherein the second binder comprises a cationic hydroxypropyl guar.

16. The composition of claim 1 wherein the second binder comprises trimethyamino (2-hydroxyl)propyl cationic guar.

17. The composition of claim 1 wherein the crosslinked biopolymer has an average particle size of less than 150 nm.

18. A method for preparing a coated seed composition having dust suppression benefits comprising the step of contacting at least a portion of at least one seed with at least one layer comprising:
  a crosslinked biopolymer having an average particle size of less than 400 nm, wherein the crosslinked biopolymer is less than 1% wt of the at least one seed; and
  optionally, a second binder comprising guar, derivatized guar, starch, derivatized starch, or a combination of any of the foregoing,
  wherein the coated seed composition is characterized by a dust value, as measured using a Heubach dustmeter device, which is lower by at least 30% as compared to an untreated seed that does not contain the crosslinked biopolymer or the at least one layer.

19. The method of claim 18 wherein the Heubach dustmeter is set with the following parameters: rotation speed 30 rpm, rotation time 120 seconds and airflow rate 20 L/min.

20. The method of claim 18 wherein is characterized by a dust value, as measured using a Heubach dustmeter device, which is lower by at least 70% as compared to an untreated seed that does not contain the crosslinked biopolymer or the at least one layer.

21. The method of claim 18 wherein composition is characterized by a dust value, as measured using a Heubach dustmeter device, which is lower by at least 90% as compared to an untreated seed that does not contain the crosslinked biopolymer or the at least one layer.

22. The method of claim 18 wherein the Heubach dustmeter is set with the following parameters: rotation speed 30 rpm, rotation time 120 seconds and airflow rate 20 L/min.

23. The method of claim 18 wherein the layer comprises the crosslinked biopolymer and the second binder.

24. The method of claim 18 wherein the crosslinked biopolymer is amylose or amylopectin.

25. The method of claim 18 wherein the second binder comprises a cationic hydroxypropyl guar.

26. The method of claim 18 wherein the second binder comprises trimethyamino (2-hydroxyl)propyl cationic guar.

* * * * *